US007278369B2

(12) United States Patent
Kelley et al.

(10) Patent No.: US 7,278,369 B2
(45) Date of Patent: Oct. 9, 2007

(54) TEMPERATURE INDICATOR USING THERMOCHROMIC MATERIALS

(75) Inventors: Frank Kelley, Hudson, OH (US); Barry Rosenbaum, Shaker Heights, OH (US)

(73) Assignee: The University of Akron, Akron, OH (US)

( * ) Notice: Subject to any disclaimer, the term of this patent is extended or adjusted under 35 U.S.C. 154(b) by 0 days.

(21) Appl. No.: 10/504,038

(22) PCT Filed: Feb. 6, 2003

(86) PCT No.: PCT/US03/03717

§ 371 (c)(1),
(2), (4) Date: Aug. 5, 2004

(87) PCT Pub. No.: WO03/065856

PCT Pub. Date: Aug. 14, 2003

(65) Prior Publication Data

US 2005/0139142 A1   Jun. 30, 2005

(51) Int. Cl.
B60C 23/06 (2006.01)
(52) U.S. Cl. ............... 116/34 A; 116/216; 374/162; 152/154.2; 152/525
(58) Field of Classification Search ........... 116/34 A, 116/207, 216, 217; 374/162; 428/493; 152/152.1, 154.2, 524, 525, 151, 450
See application file for complete search history.

(56) References Cited

U.S. PATENT DOCUMENTS

| | | | |
|---|---|---|---|
| 3,770,040 A | 11/1973 | De Cicco | |
| 3,872,050 A * | 3/1975 | Benton et al. | 524/774 |
| 4,028,118 A | 6/1977 | Nakasuji et al. | |
| 4,215,208 A * | 7/1980 | Yee et al. | 526/285 |
| 4,317,479 A | 3/1982 | McDonald | |
| 4,318,436 A | 3/1982 | Shurman | |
| 4,421,560 A | 12/1983 | Kito et al. | |
| 4,425,161 A | 1/1984 | Shibahashi et al. | |
| 4,428,321 A * | 1/1984 | Arens | 116/217 |
| 4,450,023 A | 5/1984 | De Blauwe | |
| 4,732,810 A * | 3/1988 | Kito et al. | 428/402.2 |
| 4,925,727 A * | 5/1990 | Brown et al. | 428/199 |
| 4,971,725 A | 11/1990 | Nagel | |
| 5,085,607 A * | 2/1992 | Shibahashi et al. | 446/14 |
| 5,157,082 A * | 10/1992 | Johnson | 525/237 |
| 5,160,383 A * | 11/1992 | Gartland et al. | 152/510 |
| 5,325,721 A * | 7/1994 | Pendergrass, Jr. | 73/762 |
| 5,335,540 A | 8/1994 | Bowler et al. | |
| 5,375,271 A * | 12/1994 | Frankel | 4/581 |
| 5,382,641 A | 1/1995 | Kawate | |
| 5,470,893 A | 11/1995 | Sinclair-Day et al. | |
| 5,503,583 A * | 4/1996 | Hippely et al. | 446/14 |
| 5,721,059 A * | 2/1998 | Kito et al. | 428/522 |
| 5,736,472 A | 4/1998 | Mahn, Jr. et al. | |
| 5,834,530 A * | 11/1998 | Ramcke et al. | 522/157 |
| 5,856,378 A | 1/1999 | Ring et al. | |
| 5,922,996 A | 7/1999 | Ryeczek | |
| 5,932,309 A | 8/1999 | Smith et al. | |
| 5,962,778 A | 10/1999 | Billieres | |
| 6,074,742 A | 6/2000 | Smith et al. | |
| 6,093,271 A * | 7/2000 | Majumdar | 156/116 |
| 6,150,019 A | 11/2000 | Smith et al. | |
| 6,153,299 A | 11/2000 | Smith et al. | |
| 6,165,234 A * | 12/2000 | Kanakkanatt | 44/275 |
| 6,252,001 B1 | 6/2001 | Babb et al. | |
| 6,255,940 B1 | 7/2001 | Phelan et al. | |
| 6,298,889 B1 * | 10/2001 | Smith | 152/151 |
| 6,344,506 B2 * | 2/2002 | Vasseur | 524/91 |
| 6,369,712 B2 | 4/2002 | Letkomiller et al. | |
| 6,474,382 B1 * | 11/2002 | Finck | 152/209.5 |
| 6,476,131 B1 * | 11/2002 | Hamed et al. | 525/91 |
| 6,491,037 B1 * | 12/2002 | Mortenson | 128/859 |
| 6,523,590 B2 * | 2/2003 | Meier et al. | 152/525 |
| 6,561,243 B2 * | 5/2003 | Zanzig et al. | 152/209.5 |
| 6,706,218 B2 | 3/2004 | Lucht et al. | |
| 7,156,936 B2 * | 1/2007 | Frantz et al. | 156/116 |

(Continued)

FOREIGN PATENT DOCUMENTS

DE        70 26 842        10/1972

(Continued)

OTHER PUBLICATIONS

European Search Report for European Application No. 03707780.

*Primary Examiner*—G. Bradley Bennett
*Assistant Examiner*—Amy R. Cohen
(74) *Attorney, Agent, or Firm*—Roetzel & Andress, LPA; George W. Moxon, II

(57) ABSTRACT

A temperature indicator for a rubber article comprises a thermochromic material, wherein the thermochromic material is a component of a rubber article selected from the group consisting of tires, belts and hoses. A rubber article containing a temperature indicator is also disclosed, wherein the temperature indicator comprises a thermochromic material compounded with an elastomeric compound to form an elastomeric temperature indicator. A method of determining the operating temperature of a rubber article comprises incorporating at least one thermochromic material into a rubber article, the at least one thermochromic material having the property of changing color at a predetermined temperature, and examining the thermochromic material for a change in color, wherein the rubber article is selected from the group consisting of tires, belts and hoses.

22 Claims, No Drawings

U.S. PATENT DOCUMENTS

| | | |
|---|---|---|
| 7,204,284 B2 * | 4/2007 | Paturle et al. ............... 152/523 |
| 7,232,498 B2 * | 6/2007 | Zimmer et al. ............. 156/116 |
| 2002/0066507 A1 | 6/2002 | Sievi-Korte et al. |
| 2002/0074692 A1 * | 6/2002 | Wang ......................... 264/293 |
| 2003/0047264 A1 | 3/2003 | Yurjevich et al. |
| 2003/0140999 A1 * | 7/2003 | Smith et al. ................ 152/524 |
| 2005/0008809 A1 * | 1/2005 | Miller et al. ............... 428/40.1 |
| 2005/0087725 A1 * | 4/2005 | Kanakkanatt ............ 252/408.1 |
| 2006/0032569 A1 * | 2/2006 | Zimmer et al. ............. 152/524 |
| 2006/0042366 A1 * | 3/2006 | Carrus et al. ................. 73/146 |

FOREIGN PATENT DOCUMENTS

| | | |
|---|---|---|
| DE | 196 43 995 | 5/1998 |
| DE | 19643995 | 5/1998 |
| DE | 198 15 354 | 10/1999 |
| EP | 1 184 210 | 3/2002 |
| JP | 08 156501 | 10/1996 |
| JP | 09060587 | 8/1998 |
| WO | WO 03/023385 | 3/2003 |

* cited by examiner

TEMPERATURE INDICATOR USING THERMOCHROMIC MATERIALS

TECHNICAL FIELD

The present invention is directed toward a temperature indicator for use with pneumatic tires used on various vehicles and other rubber products subject to temperature-induced stress. More particularly, the present invention is directed toward a temperature indicator for use with passenger automobile and truck tires, hoses and belts.

BACKGROUND OF THE INVENTION

Tires and belts are subject to significant increases in temperature due to heat build-up in the various rubber construction components during rolling. Automotive hoses typically carry liquids at high temperatures. This can lead to a decrease in structural integrity and occasionally, to catastrophic failures. This condition is exacerbated, in the case of tires, by under-inflation and/or overloading, and/or high speeds, such that flexing frequencies and amplitudes are increased. Tire pressure indicators, which are being incorporated into the display systems for some motor vehicles, generally require sophisticated technology and relatively high expense. However, tire pressure indicators do not measure the effect of low tire pressure, i.e., a temperature increase. Elevated tire temperature can be a more direct indication of problems with tire maintenance, including, but not limited to, under-inflation. Proper tire inflation is known to have a significant impact on fuel consumption as well.

Heat generation in tires is related to the energy loss per deformation cycle, and is proportional to the first power of the frequency and to the second power of the amplitude (energy loss$\propto$frequency+amplitude$^2$) in the dynamic response of rubbers. Because rubber is a very poor conductor of heat, the temperature increase is a coupled, sensitive indicator of poor tire maintenance and abuse.

Heretofore, temperatures have been difficult to monitor in rubber products, such as tires, belts, and vibration isolation components. A need exists for a tire safety indicator which is capable of warning drivers and observers of impending tire failures due to overheating, from under-inflation or other causes. Likewise, a need also exists for an indicator which is capable of warning an observer of impending failure of other rubber products due to overheating.

SUMMARY OF INVENTION

It is, therefore, an object of the present invention to provide a temperature indicator, for tires and other rubber products.

It is another object of the present invention to provide a method of visually monitoring the temperature of a tire, belt or hose.

In general, the present invention provides a temperature indicator for a rubber article comprising a thermochromic material, wherein the thermochromic material is a component of a rubber article selected from the group consisting of tires, belts and hoses.

The present invention also provides a rubber article that contains a temperature indicator, wherein the temperature indicator comprises a thermochromic material compounded with an elastomeric compound to form an elastomeric temperature indicator.

The present invention also provides a method of determining the operating temperature of a rubber article comprising incorporating at least one thermochromic material into a rubber article, the at least one thermochromic material having the property of changing color at a predetermined temperature, and examining the thermochromic material for a change in color, wherein the rubber article is selected from the group consisting of tires, belts and hoses.

PREFERRED EMBODIMENT FOR CARRYING OUT THE INVENTION

According to the present invention, a thermochromic material is a component of a rubber product such as a tire, belt or hose. This indicator preferably undergoes a visible color change at a temperature or temperature range deemed to be detrimental to the product's performance or safety and thereby will give a warning that replacement or adjustment of operating conditions is necessary. For example, excess heat exposure in tires may indicate that an adjustment in tire pressure or other factors such as wheel alignment and/or reduction in driving speed is necessary.

According to the present invention, the thermochromic material may optionally be microencapsulated. Microencapsulation of the thermochromic material provides various advantages, such as improved handling of the encapsulated thermochromic material. It is envisioned that the thermochromic material may be encapsulated in thin, transparent plastic, spherical or similarly shaped shells. The diameter of the microencapsulated thermochromic material particles may range in diameter from less than one micrometer to several hundred micrometers, depending on the encapsulation process.

The microencapsulating material may be a thermoplastic or thermosetting polymer. In those applications where the thermochromic material is incorporated into the sidewall of a tire, it is preferred that the glass transition temperature ($T_g$) of the encapsulating material be greater than the curing temperature of the tire. The use of a microencapsulating material may also permit the use of an ultraviolet stabilizer, to prevent the deterioration of the thermochromic material by sunlight.

In one example, the thermochromic material reversibly changes color at a prescribed temperature or temperature range. In another example, the color change exhibited by the thermochromic material is irreversible, particularly in those situations where the temperature may rise to a level likely to cause permanent damage to the rubber article. In another example, a thermochromic material is used that undergoes a color change reversibly at a lower prescribed temperature or temperature range, and irreversibly at a higher temperature.

The thermochromic material, which acts as a temperature indicator, may be incorporated into a rubber product in any of a number of ways. For example, the thermochromic material, may be incorporated into a tire as a white or colorless spot located on the sidewall, or incorporated into raised lettering, or as a small strip across a white or black sidewall. Similarly, the thermochromic material may be incorporated into the surface of the article as ornamentation. It is also envisioned that the present invention may take the form of a strip of thermochromic material compounded into a polymer, such as an elastomer which may be applied to the side wall of a tire or to a hose or belt as an after-market product. It is further envisioned that the thermochromic material may be placed on an interior surface of a tire, especially in those applications where the thermochromic material undergoes an irreversible color change at a specified temperature.

One example of the present invention uses a thermochromic material which is positive for color change; that is, it changes from colorless to a distinct color when heated above a prescribed temperature (e.g. 120° C.). In such an application, a tire with a thermochromic material incorporated into the tire sidewall could be constructed with standard black rubber underlying the thermochromic material. When operating at a proper temperature, such a tire would appear black. However, if the temperature rises above the point at which the thermochromic material changes color, the black rubber layer would no longer be visible through the thermochromic material, and the color of the thermochromic material would be visible instead. Similar arrangements may be used for other articles such as belts and hoses, including those used in internal combustion engines or in hydraulic or steam handling applications and the like.

Another application would use a negative color type thermochromic material; that is, a material which changes from a color, such as black, at lower temperatures to colorless or clear at a higher prescribed temperature. The thermochromic material is incorporated into an external sidewall layer, and is bonded to a substrate layer containing a different color, such as red. The substrate layer may be colored with a stable pigment of choice, which is not thermochromic itself, but would be rendered visible when the top or external, thermochromic containing layer changes from colored to a clear appearance. A tire may be produced according to this example as follows.

A thin layer of an elastomeric composition containing a colored thermochrome (for example, black or other suitable color consistent with the aesthetic appearance of a tire sidewall) is bonded to a thin, brightly colored (such as red, for example) substrate layer, compounded as a compatible elastomer. The form of this elastomeric laminate may be a strip, produced as a roll or winding, which is incorporated into the tire building process to provide a non-structural sidewall component. The final molded and cured tire would exhibit an exterior appearance of the thermochromic compound in selected regions, such as in raised lettering, logos, strategically located spots or as a continuous ring along the entire sidewall. Beneath the surface layer would be the brightly colored layer that would become a visible indicator of tire overheating when the surface layer clears of its color. The colored under-layer would contain any of the common coloring pigments used in colored rubber products and would preferably be stable in the aggressive weather and road conditions experienced by tires. The external layer would optionally also contain various stabilizers such as antioxidants, antiozonants, and ultraviolet protectants.

By this warning indicator, motorists and service agents may note whether one or more tires is overheating when a vehicle has been driven into a service station or stops at a destination for example. An individual may thereby be alerted to the fact that some correction of the condition is required, such as restoring the recommended tire pressure. Additionally, the present invention may provide an indication that a tire has been subjected to temperatures that have permanently damaged the tire. Such an application may also assist in accident reconstruction efforts.

It is envisioned that the present invention would be particularly useful in automobile tires and truck tires, but the present invention is not limited thereto. The present invention may be used in tires for passenger vehicles of all kinds, including bus tires, aircraft tires, motorcycle tires, and utility vehicle tires, for example. It may also be used in belts and hoses such as those found in internal combustion engines or in other applications where they may be exposed to high temperat.

The present invention allows for monitoring of tire temperatures during use with minimal additional production steps or effort. For direct incorporation, a mold insert could be used such as those used for identification serial numbers. An alternative would be incorporation of the thermochromic material into an adhesive patch. Such a patch may be either permanent or temporary. It is envisioned that the thermochromic material may be first incorporated into a suitable elastomer by normal compounding methods to form an elastomeric temperature indicator. The elastomeric temperature indicator may then either become a part of the sidewall compound, indexed by its location in the tire mold, or by subsequent attachment as a strip with an adhesive. When the strip is adhered to the tire sidewall after curing, a flexible, non-rigid adhesive is preferred. However, a rigid adhesive such as cyanoacrylate, for example, may also be used. The elastomeric thermochromic indicator may be a compound co-cured with the tire and may include a thermoplastic elastomer. The elastomeric thermochromic indicator may also be attached to the tire at a later stage in the production cycle. The thermochromic material is preferably stable under cure conditions in the tire, e.g. 170° C., for 20-40 minutes.

In order to demonstrate the practice of the present invention, the following examples are presented. The following examples should not be viewed as limiting the scope of the invention. The claims will serve to define the inventions.

Chromocolor® materials in a PVC concentrate solution (Matsui International Inc.) were incorporated into a medium acrylonitrile nitrile-butadiene rubber (NBR) as described below. The chromophore mixtures included Chromicolor® PVC Conc Sol Type 45, Chromicolor® PVC Conc Sol Type 47 and Chromicolor® PVC Conc Sol Type 60. The components listed in Table I were weighed and mixed on a six inch, two roll rubber mill according to accepted practices in the rubber industry. An oscillating disk rheometer (ODR) (Monsanto R-100) was used to determine the cure time for these compounds at 320° F. (160° C.). A cure time of 10 minutes was determined to correspond to a cure level of 95 percent.

In one experiment, the compounded materials were molded into test buttons/cylinders approximately 0.75 inches in diameter by 1.00 inches in height. The cylindrical samples were placed between the anvils of a Goodrich Flexometer. The top anvil of the apparatus was driven at 1800 rpm (30 Hz). This movement produced a sinusoidal deformation of the test sample in compression. Heating of the sample occurs due to internal friction as a result of the internal movement of polymer chains and their interaction with other additives in the test formulation. This same phenomenon is associated with heat buildup in a tire. For example, a 15 inch tire rotating on a vehicle at a velocity of 60 mph is equivalent to an internal deformation and recovery rate of approximately 11 Hz.

TABLE I

| Component | Amount (phr) |
| --- | --- |
| Medium NBR (Chemigum N608) | 100 |
| Sulfur (cure agent) | 1.5 |
| Stearic Acid (activator) | 1.0 |
| Zinc Oxide (activator) | 5 |
| Clay | 35 |

TABLE I-continued

| Component | Amount (phr) |
|---|---|
| HiSil 532 (white reinforcing agent) | 45 |
| Paraplex G25 (plasticizer) | 4 |
| TiO$_2$ (whitener) | 40 |
| Mercaptobenzothiazole (MBTS) (cure accelerator) | 1 |
| Tertramethyl thiuram disulfide (TMTM) (cure accelerator) | .25 |
| Diphenyl quanidine (DPG) (cure accelerator) | .25 |
| Chromocolor ® | 110 |

During the test, as the sample heated, the color of the test buttons changed from colored to colorless. The temperature at which this occurred depended on the specific thermochromic material used in the formulation. However, the precise temperatures at which the color changes occurred were not measured, because it is believed that the interior of the cylinders heated and changed color prior to the exterior surfaces, due to heat dissipation from the surfaces. However, color changes were observed for these samples.

The temperatures at which the chromophoric materials undergo a color change was determined by placing the materials in a hot air circulating oven on a thermally non-conductive surface. The temperature of the oven was increased incrementally. The approximate temperatures at which a color change was observed for each of the chromophores are listed in Table II.

TABLE II

| Chromophore | Color Change Temperature |
|---|---|
| Chromicolor ® PVC Conc Sol Fast Blue (G-O) Type 45 | 45° C. |
| Chromicolor ® PVC Conc Sol Pink (E-O) Type 47 | 57° C. |
| Chromicolor ® PVC Conc Sol Vermillion (C-O) Type 60 | 67° C. |

To further demonstrate practice of the present invention, a tire having a patch of material attached to a sidewall, was rotated under pressure on a rotating drum. The temperature of the tire was measured with an infrared pyrometer.

The tire was a 10 inch (25.4 cm) diameter tire manufactured by McMaster Carr. The normal operating air pressure of the tire is about 25 to 30 pounds per square inch (psi) (1.8-2.1 kg/cm$^2$). However, in order to insure adequate simulation of heat build-up caused by accidental under-inflation or other causes, the tire was deliberately under-inflated to less than 10 psi (0.7 kg/cm$^2$). The wheel was rotated at approximately 11 Hz under a force of approximately 100 lbs (45 kg). This rotation rate is approximately equivalent to a standard 15 inch (38 cm) tire traveling at about 60 miles per hour (about 99 kilometers per hour).

NBR/Chromophore mixtures were compounded as described above except the mixtures were molded at 320° F. (160° C.) for 10 minutes using a 0.030 inch×3 inch×4 inch (0.76 mm×7.6 cm×10.2 cm) mold. The test sheets were cut into strips approximately 0.25 inch (0.64 cm) wide and approximately 1.5 inches (3.8 cm) long. The strips were attached to the tire sidewall just below tire tread with cyanoacrylate glue.

The color change temperatures for each of the three test materials were recorded and are listed in Table III, for both the tire temperature at which the sample changed from colored to white as temperature increased, and the tire temperature at which the sample changed from white to colored as temperature decreased.

TABLE III

| Chromophore | Color Change Temperature - Increasing Temperature | Color Change Temperature - Decreasing Temperature |
|---|---|---|
| Chromicolor ® PVC Conc Sol Fast Blue (G-O) Type 45 | 42-44° C. | 38-40° C. |
| Chromicolor ® PVC Conc Sol Pink (E-O) Type 47 | 53-55° C. | 49-50° C. |
| Chromicolor ® PVC Conc Sol Vermillion (C-O) Type 60 | 64-67° C. | 59-60° C. |

In this specification, the singular references such as "a," "an," and "the" include plural reference unless the context clearly dictates otherwise. Unless defined otherwise, all technical and scientific terms used herein have the same meaning as commonly understood to one of ordinary skill in the art to which this invention pertains.

Based upon the foregoing disclosure, it should now be apparent that the tire temperature indicator of the present invention will carry out the objects set forth hereinabove. It is, therefore, to be understood that any variations evident fall within the scope of the claimed invention and thus, the selection of specific component elements can be determined without departing from the spirit of the invention herein disclosed and described. In addition, tire temperature indicators according to the present invention are not necessarily limited to compositions containing NBR but include those compositions containing other elastomers. Non-exclusive examples of other elastomers which may be used in the present invention include natural rubber, styrene butadiene rubber, butyl rubber, ethylene propylene diene methylene rubber, polybutadiene rubber, and blends and co-polymers thereof, among others.

We claim:

1. A temperature indicator for a tire comprising a mixture of:
   at least one microencapsulated thermochromic material; and
   at least one elastomeric compound, where the combination of the at least one microencapsulated thermochromic material and the at least one elastomeric compound yield a thermochromic-containing uncured rubber mixture that is stable under rubber curing conditions where such curing conditions are conducted at a temperature of at least about 160° C.,
   wherein the temperature indicator is designed to function after rubber cure in one or more of, but not all of, the tread, sidewall or innerliner of the tire.

2. The temperature indicator of claim 1, wherein the thermochromic-containing uncured rubber mixture is incorporated into the sidewall of the tire.

3. The temperature indicator of claim 1, wherein the temperature indicator changes color reversibly at a predetermined temperature.

4. The temperature indicator of claim 1, wherein the at least one microencapsulated thermochromic material is encapsulated by a thermoplastic or thermosetting polymer, the polymer having a glass transition temperature that is greater than the curing temperature of the tire.

5. The temperature indicator of claim 1, wherein the at least one microencapsulated thermochromic material comprises particles having a diameter of from one micrometer to several hundred micrometers.

6. The temperature indicator of claim 1, wherein the at least one microencapsulated thermiochromic material is encapsulated in a thin, transparent plastic and the plastic is thermoplastic or thermosetting polymer.

7. The temperature indicator of claim 1, wherein the at least one microencapsulated thermochromic material is stable at a temperature of about 170° C. for at feast about 20 minutes.

8. A tire containing a temperature indicator located in one or more of, but not all of, the sidewall, tread or innerliner, the temperature indicator comprising a mixture of:
   at least one microencapsulated thermochromic material; and
   at least one elastomeric compound, where the combination of the at least one microencapsulated thermochromic material and the at least one elastomeric compound yield a thermochromic-containing uncured rubber mixture that is stable under rubber curing conditions where such curing conditions are conducted at a temperature of at least about 160° C., wherein the temperature indicator is designed to function after rubber cure in one or more of, but not all of, the tread, sidewall or innerliner of the tire.

9. The tire of claim 8, wherein the temperature indicator is located in a rubber mixture that forms a sidewall of the tire.

10. The tire of claim 8, wherein the temperature indicator is located in a rubber mixture that forms an interior surface of the tire.

11. The tire of claim 8, wherein the temperature indicator is located in a rubber mixture that is attached to a sidewall of the tire.

12. The tire of claim 8, wherein the temperature indicator changes color reversibly at a predetermined temperature.

13. The tire of claim 8, wherein the tire is selected from the group consisting of automobile tires, truck tires, bus tires, aircraft tires, motorcycle tires, and utility vehicle tires.

14. The tire of claim 8, wherein the at least one microencapsulated thermochromic material is stable at a temperature of about 170° C. for at least about 20 minutes.

15. The tire of claim 8, wherein the at least one microencapsulated thermochromic material is encapsulated by a thermoplastic or thermosetting polymer, the polymer having a glass transition temperature that is greater than the curing temperature of the tire.

16. A method of determining the operating temperature of a tire comprising:
   incorporating at least one thermochromic material into one or more of, but not all of, the tire tread, sidewall, or innerliner, wherein the at least one thermochromic material is a mixture of:
      at least one microencapsulated thermochromic material; and
      at least one elastomeric compound, where the combination of the at least one microencapsulated thermochromic material and the at least one elastomeric compound yield a thermochromic-containing uncured rubber mixture that is stable under rubber curing conditions where such curing conditions are conducted at a temperature of at least about 160° C. and where the at least one thermochromic material changes color at a predetermined temperature;
   curing the tire:
   placing the tire into use; and
   examining the at least one thermochromic material for a change in color.

17. The method of claim 16, wherein the thermochromic material changes color reversibly at a predetermined temperature.

18. The method of claim 16, wherein the temperature indicator is located in a rubber mixture that forms an interior surface of the tire.

19. The method of claim 16, wherein the temperature indicator is located in a rubber mixture that forms a sidewall of the tire.

20. The method of claim 17, wherein the temperature indicator is located in a rubber mixture that is attached to a sidewall of the tire.

21. The method of claim 16, wherein the at least one microencapsulated thermochromic material is stable at a temperature of about 170° C. for at least about 20 minutes.

22. The method of claim 16, wherein the at least one microencapsulated thermochromic material is encapsulated by a thermoplastic or thermosetting polymer, the polymer having a glass transition temperature that is greater than the curing temperature of the tire.

* * * * *